United States Patent
Geveci (10) Patent No.: US 9,568,897 B2
(45) Date of Patent: Feb. 14, 2017

(54) CONTROLLER SYSTEM FOR VARIABLE PARAMETER AND RELATED PROGRAM PRODUCT

(71) Applicant: General Electric Company, Schenectady, NY (US)

(72) Inventor: Mert Geveci, Delmar, NY (US)

(73) Assignee: General Electric Company, Schenectady, NY (US)

(*) Notice: Subject to any disclaimer, the term of this patent is extended or adjusted under 35 U.S.C. 154(b) by 704 days.

(21) Appl. No.: 14/146,085

(22) Filed: Jan. 2, 2014

(65) Prior Publication Data

US 2015/0185714 A1    Jul. 2, 2015

(51) Int. Cl.
   *G05B 13/04*  (2006.01)
   *G05B 11/42*  (2006.01)
   *G05B 13/02*  (2006.01)

(52) U.S. Cl.
   CPC .............. *G05B 13/04* (2013.01); *G05B 11/42* (2013.01); *G05B 13/021* (2013.01)

(58) Field of Classification Search
   CPC ....... G05B 13/04; G05B 13/021; G05B 11/42; G05B 13/00; G05B 2219/39215; G05B 2219/39243; G05B 2219/42036; G05B 2219/41152; F02D 2041/1409; B01J 19/0033; B23Q 15/12

(Continued)

(56) References Cited

U.S. PATENT DOCUMENTS 4,602,326 A * 7/1986 Kraus .................... G05B 15/02
                                                        318/561
5,453,925 A * 9/1995 Wojsznis ............. G05B 13/025
                                                        318/561

(Continued)

FOREIGN PATENT DOCUMENTS

DE   102009020744   11/2010
EP      0260259 B1    7/1990

(Continued)

OTHER PUBLICATIONS

Astrom, "Adaptive Control Around 1960", IEEE, Jun. 1996, pp. 44-49.*

(Continued)

*Primary Examiner* — Kenneth M Lo
*Assistant Examiner* — Olvin Lopez Alvarez
(74) *Attorney, Agent, or Firm* — Ernest G. Cusick; Hoffman Warnick LLC (57) ABSTRACT

A controller system includes at least one computing device operably connected to a process having a target value for a variable parameter. The computing device(s) is configured to control the variable parameter by performing actions including: computing an error between the target value and an actual value of the variable parameter. Based on the error, the computing device(s) may calculate a desired gain adjustment of the variable parameter, and a desired mean adjustment of the variable parameter. A correction signal may be created for modifying the process by: in response to the error being positive, creating the correction signal by adding the desired mean adjustment and the desired gain adjustment, and in response to the error being negative, creating the correction signal by differencing the desired mean adjustment and the desired gain adjustment. A related program product may carry out similar functions.

20 Claims, 6 Drawing Sheets

(58) Field of Classification Search
USPC .................................................... 700/29, 52
See application file for complete search history.

(56) References Cited

U.S. PATENT DOCUMENTS

| | | | | |
|---|---|---|---|---|
| 2007/0256406 | A1* | 11/2007 | Makki | F01N 11/007 |
| | | | | 60/277 |
| 2010/0185304 | A1* | 7/2010 | El-Rifai | G05B 11/42 |
| | | | | 700/45 |

FOREIGN PATENT DOCUMENTS

| | | |
|---|---|---|
| EP | 0813294 A2 | 12/1997 |
| EP | 2654198 A2 | 10/2013 |
| WO | 8300753 A1 | 3/1983 |
| WO | 9812611 A1 | 3/1998 |

OTHER PUBLICATIONS

Ferdous, "Advanced Process Control and Relay Auto-tuning", 2005, pp. 148.*

Schuck, "Honeywell's History and Philosophy in the Adaptive Control Field", 1961, pp. 123-145.*

Hornsey,, "A Review of Relay Auto-tuning Methods for the Tuning of PID-type Controllers", Oct. 2012, pp. 43.*

European Search Report and Opinion issued in connection with corresponding EP Application No. 14199283.4 on Jul. 1, 2015 , pp. 4.

Astrom et al., "Adaptive Control", Prentice Hall, Dec. 31, 1994, pp. 426-427.

* cited by examiner

CONTROLLER SYSTEM FOR VARIABLE PARAMETER AND RELATED PROGRAM PRODUCT

BACKGROUND OF THE INVENTION

1. Technical Field

The disclosure is related generally to a controller system. More particularly, the disclosure is related to a controller system for a variable parameter and a related program product.

2. Related Art

Most control problems involve the design and/or synthesis of a controller system that is robust to process uncertainty. Process control applications often pose the additional challenge of custom installations where the level and type of uncertainty are not only driven by (uncontrolled) manufacturing variability, but are often imposed by design changes implemented to fit a customer's specific requirements. Most of the time field engineers (who may or may not have a background in feedback control systems) are required to tune controller systems in the field. Typically, the controllers selected for field tuning are of the PID variety (Proportional+Integral+Derivative) as the tuning for PID controllers are relatively more straightforward, better understood, and well-established, but still very challenging to manage.

Figure 1:
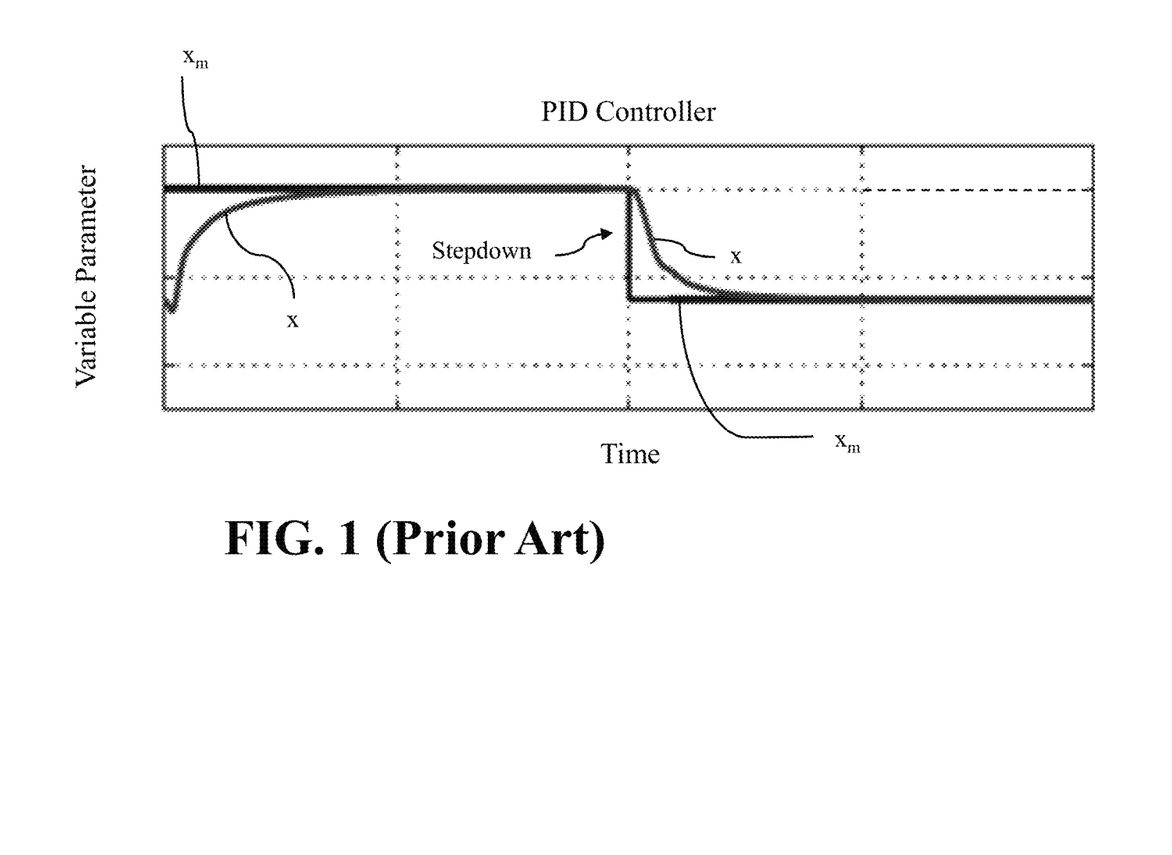
FIG. 1 shows a linear graph illustrating an operation of a proportional-integral (PI) controller according to related art.

The primary limitation of PID controllers is the lack of robustness to unmodeled dynamics. As PID controllers are linear and utilize fixed parameters, the closed loop performance of a PID-controlled system is sensitive to unmodeled process dynamics. For example, as shown in FIG. 1, a conventional PID controller may control a variable parameter, such that over a period of time, the actual parameter value (x) is substantially identical to the target values ($x_m$) of the variable parameter. However, as shown in FIG. 1, in response to a disturbance, such as the indicated initial start of the process or a significant change (e.g., stepdown) in the target value, the process utilizing the PID controller may take a significant, undesirable amount of time to reach the target value. The time it takes to reach the target value is strongly dependent on the overall process dynamics and any unmodeled aspects of the process dynamics may result in slower system response or in a closed loop unstable system.

This sensitivity to unmodeled dynamics can lead to several challenges. In cases where one set of controller parameters is used for a large number of units (i.e., mass production) unit-to-unit variability can significantly challenge the overall capability of PID controllers. In cases where individual units are custom-designed it is often possible to calibrate individual units and combat unit-to-unit variability challenges, however, these individual tuning exercises are often costly and effectiveness of the resulting calibrations is highly variable due to the varying background of field engineers.

Figure 2:
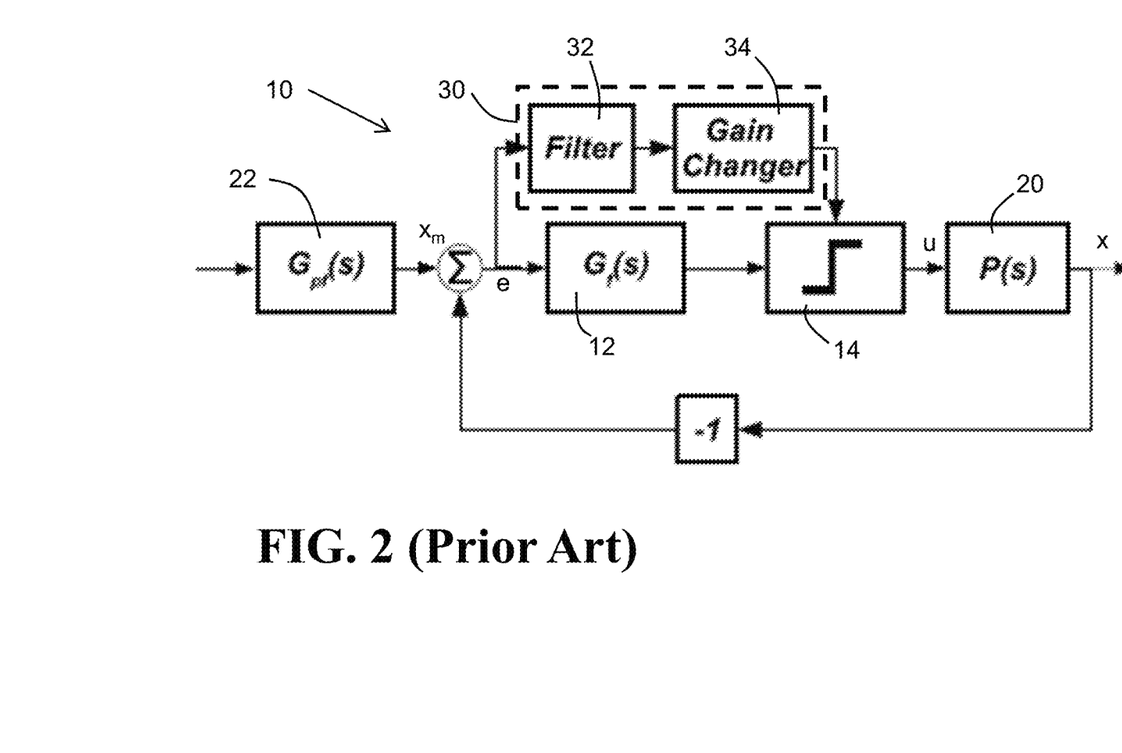
FIG. 2 shows a block diagram of a self-oscillating adaptive controller according to related art.
Figure 3:
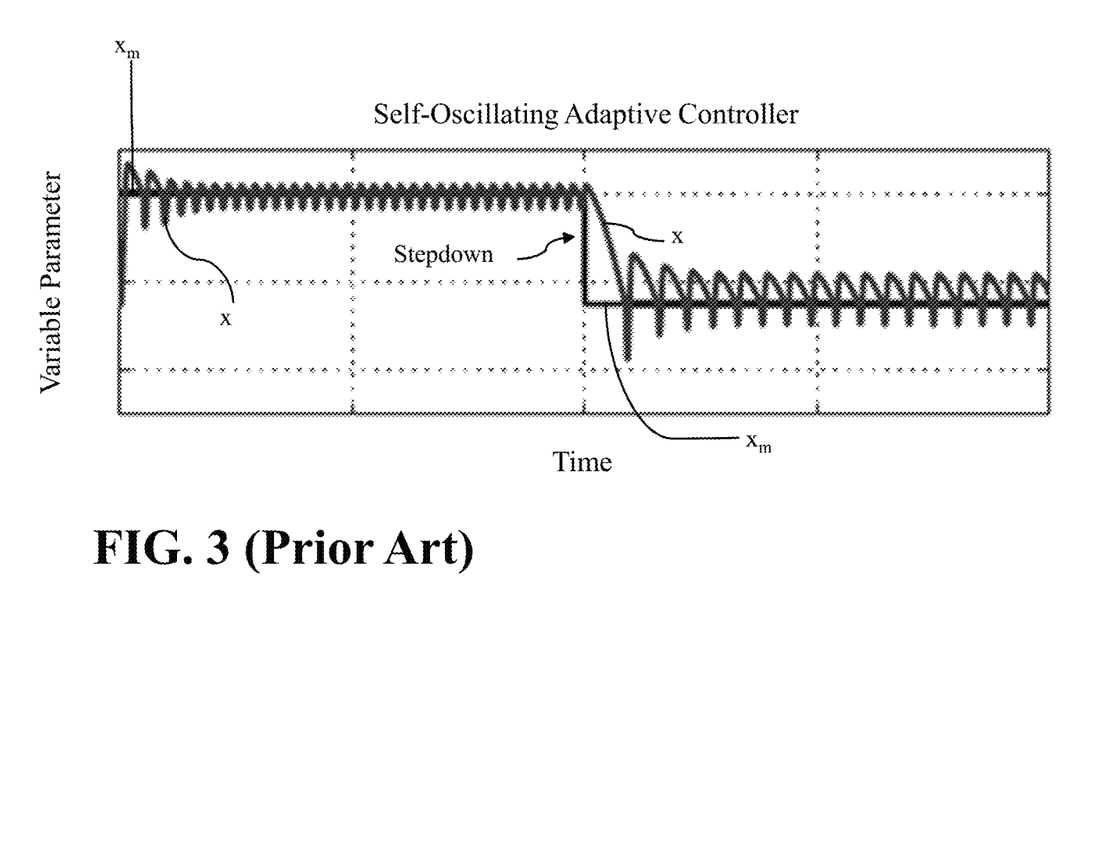
FIG. 3 shows a linear graph illustrating an operation of a self-oscillating adaptive controller (SOAC) according to related art.

Another example of a conventional controller system may include a self-oscillating adaptive controller. A block diagram for a standard self-oscillating adaptive (SOA) controller 10 is shown in FIG. 2. An SOA controller 10 typically includes a linear compensator 12 (and perhaps a second filter (not shown) for the primary forward loop)), a relay 14 in the primary forward loop, and a gain changer subsystem 30 to modify the gain of the relay. A process 20 at issue has a variable parameter x responsive to a command or correction signal u that ideally follows a target value $x_m$ provided by a reference model 22. Linear compensator 12 can be constructed in any necessary form as established in the literature (e.g., using a linear low-order filter or the use of a process model representing the entitlement capability of the closed loop system). For example, linear compensator 12 ($G_f(s)$) may include a lead compensation filter and can be utilized to set the frequency of limit cycles (i.e., the oscillations or "chatter" that the relay will cause at steady-state). Gain changer subsystem 30 typically includes a low-pass filter 32 followed by a nonlinear, gain changer function 34 to determine the size of the gain for different operating conditions. The primary purpose of gain changer function 34 is to slowly alter the gain so that the system can have high gain levels that provide the robustness under transient conditions (characterized by large filtered error values), while lowering the gain of relay 14 under steady-state conditions (characterized by low filtered error values). As illustrated by comparing FIG. 3 to FIG. 1, SOA controller 10 may more quickly move the actual variable parameter value x of process 20 toward target value $x_m$ during unmodeled dynamics, e.g., an initial start of the process or during a significant change in the desired value. However, as shown in FIG. 3, SOA controller 10 output may continuously oscillate within a fairly large range both above and below target value $x_m$. As a result, while SOA controller 10 may allow the process to operate closer to target value $x_m$ quickly, the large fluctuation in values is not ideal.

Most existing control algorithms that are capable of providing robust closed loop response are of moderate to high complexity. The synthesis of such systems may require detailed theoretical analysis as well as an in-depth understanding of the process dynamics. This additional complexity is often the driving factor for the selection of PID controllers for many practical feedback control applications despite their stated limitations.

BRIEF DESCRIPTION OF THE INVENTION

A controller system includes at least one computing device operably connected to a process having a target value for a variable parameter. The computing device(s) is configured to control the variable parameter by performing actions including: computing an error between the target value and an actual value of the variable parameter. Based on the error, the computing device(s) may calculate a desired gain adjustment of the variable parameter, and a desired mean adjustment of the variable parameter. A correction signal may be created for modifying the process by: in response to the error being positive, creating the correction signal by adding the desired mean adjustment and the desired gain adjustment, and in response to the error being negative, creating the correction signal by differencing the desired mean adjustment and the desired gain adjustment. A related program product may carry out similar functions.

A first aspect of the invention includes a controller system comprising: at least one computing device operably connected to a process having a target value for a variable parameter, the at least one computing device configured to control the variable parameter by performing actions including: computing an error between the target value and an actual value of the variable parameter; based on the error, calculating a desired gain adjustment of the variable parameter; based on the error, calculating a desired mean adjustment of the variable parameter; and creating a correction signal for modifying the process by: in response to the error being positive, creating the correction signal by adding the desired mean adjustment and the desired gain adjustment, and in response to the error being negative, creating the correction signal by differencing the desired mean adjustment and the desired gain adjustment.

A second aspect of the invention includes a program product stored on a non-transitory computer readable storage medium for controlling a process having a target value for a variable parameter, the non-transitory computer readable storage medium comprising program code for causing a computer system to: compute an error between the target value and an actual value of the variable parameter; based on the error, calculate a desired gain adjustment of the variable parameter; based on the error, calculate a desired mean adjustment of the variable parameter; and create a correction signal for modifying the process by: in response to the error being positive, creating the correction signal by adding the desired mean adjustment and the desired gain adjustment, and in response to the error being negative, creating the correction signal by differencing the desired mean adjustment and the desired gain adjustment.

A third aspect of the invention includes a controller system comprising: at least one computing device operably connected to a process having a target value for a variable parameter, the at least one computing device configured to control the variable parameter by performing actions including: computing an error between the target value and an actual value of the variable parameter; based on the error, calculating a desired gain adjustment of the variable parameter by: low pass filtering the error, determining a gain adjustment based on the low pass filtered error, and combining the determined gain adjustment with a predetermined gain adjustment to calculate the desired gain adjustment; based on the error, calculating a desired mean adjustment of the variable parameter by: determining a mean adjustment of the error using a sub-controller that is one of a proportional, proportional plus integral or a proportional plus integral plus derivative, and combining the determined mean adjustment with a predetermined mean adjustment to calculate the desired mean adjustment; and creating a correction signal for modifying the process by: in response to the error being positive, creating the correction signal by adding the desired mean adjustment and the desired gain adjustment, and in response to the error being negative, creating the correction signal by differencing the desired mean adjustment and the desired gain adjustment.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 4:
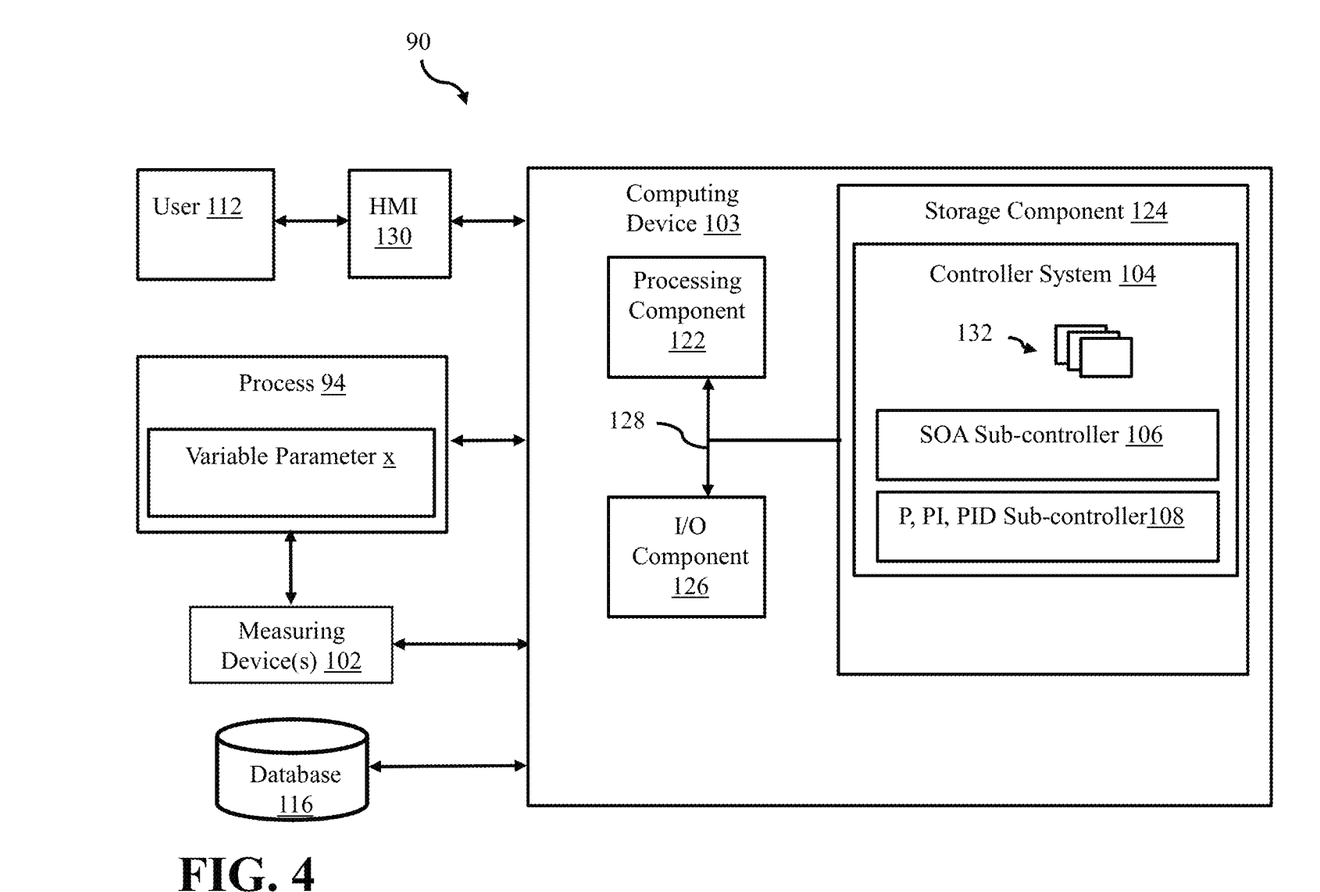
FIG. 4 shows an illustrative environment including a controller system for a process having a target value for a variable parameter according to embodiments of the invention.

Turning to FIG. 4, an illustrative environment 90 according to embodiments of the invention is provided. Environment 90 includes a process 94 having a variable parameter x. The "variable parameter" as used herein may be any value of process 94 that can be controlled in some fashion. The variable parameter may be measured directly or calculated from other parameters. For example, a variable parameter may be a measurable physical characteristic of a manufacturing method, a calculate-able or estimate-able value of a system, etc. More particularly, the variable parameter can take any form including but not limited to: temperature, heat, flow rate, rotational speed, pressure, enthalpy, a physical dimension, etc. Similarly, the "process" may be any possible activity or application that has a variable parameter that can be controlled, i.e., an input and an output. For example, in general terms, the process may include but is not limited to: a series of actions for a chemical manufacturing method, a machine, an electric circuit, etc. Process 94, as shown in FIG. 4, may include any conventional component capable of controlling variable parameter x either directly or indirectly. That is, variable parameter x may be controlled or influenced by one or more components, depending on process 94. For example, where variable parameter x includes an amount of heat added via a heat exchanger, a valve may regulate the amount of heat added to the working fluid (e.g., steam, gas) as it flows through the heat exchanger. Controller system 104 may move variable parameter x toward a target value by modifying the process, e.g., by modifying the valve.

As shown in FIG. 4, environment 90 may also include one or more measuring devices 102 operably connected (e.g., via wireless, hardwire, or other conventional means) to process 94 and a computing device 103. As discussed herein, measuring device(s) 102 may be configured to directly measure a variable parameter of process 94 and provide the measured actual variable parameter to computing device 103, or it may be configured to measure one or more values that can be used to calculate variable parameter x. That is, depending on process 94 and variable parameter x, computing device 103 can use the measured value directly as an indication of the variable parameter, or as part of a calculation to obtain the variable parameter. Measuring device(s) 102 may be configured as any conventional measuring component or tool, dependent upon the configuration of process 94 and the desired variable parameter x. In terms of the prior example, measuring device 102 may measure temperature. In this example, measuring device 102 may include a conventional temperature sensor for measuring the actual temperature of the working fluid flowing to process 94 during operation. Where measuring device 102 includes a temperature sensor, measuring device 102 may be configured as any conventional device configured to measure the temperature of a fluid (e.g., working fluid) in process 94, including, but not limited to: thermometer, thermocouples, thermistors, pyrometer, infrared sensor, etc. In any event, the measured value either indicates variable parameter x, or can be used to calculate the variable parameter x, perhaps with other measured values.

Environment 90 may also include a computing device 103 that can perform a process described herein in order to control operation of variable parameter x during operation of process 94. In particular, the computing device 103 is shown as including controller system 104, which makes computing device 103 operable to control the variable parameter by performing any/all of the processes described herein and implementing any/all of the embodiments described herein.

In an embodiment, as shown in FIG. 4, process 94 may be operably connected to computing device 103. More specifically, as shown in FIG. 3, process 94 and variable parameter x may be operably connected (e.g., via wireless, hardwire, or other conventional means) to computing device 103, such that computing device 103 may control operation of variable parameter x, as discussed herein.

Controller system 104 of computing device 103 may include a self-oscillating adaptive sub-controller (SOAC) 106, and a sub-controller 108 that is either proportional (P), proportional plus integral (PI), or proportional plus integral plus derivative (PID). (For brevity sake, hereinafter, sub-controller 108 shall be referred to simply as "PID sub-controller 108" although it can be proportional, proportional plus integral (PI), or proportional plus integral plus derivative (PID)). As discussed herein, each of the SOA sub-controller 106 and PID sub-controller 108 of controller system 104 may aid in the controlling of the operation of process 94 to maintain variable parameter x at or near a target value.

SOA sub-controller 106 of controller system 104 may be configured to allow controller system 104 to control variable parameter x during operation of process 94 using a modified self-oscillating adaptive process. That is, and as discussed herein, SOA sub-controller 106 may employ a self-oscillating adaptive process for controlling variable parameter x during operation of process 94, where variable parameter x may be continuously changed in an adaptive manner. The continuous changing of variable parameter x may aid in process 94 operating with actual variable parameter values that are within a range of predetermined, desired values thereof. Additionally, and as discussed herein, as a result of SOA sub-controller 106 including continuous adjustment of variable parameter x, SOA sub-controller 106 may allow process 94 to quickly reach or operate with actual variable parameter values that are within a range of predetermined, desired values thereof when it is determined the actual variable parameter and the target value thereof differ.

PID sub-controller 108 of controller system 104 may also be configured to allow controller system 104 to control variable parameter x during operation of process 94, in combination with SOA sub-controller 106. That is, and as discussed herein, SOA sub-controller 106 and PID sub-controller 108 of controller system 104 may be configured to operate in combination, to control variable parameter x during operation of process 94. PID sub-controller 108 of controller system 104 may aid in the controlling of variable parameter x, in combination with SOA sub-controller 106, using a modified proportional, proportional-integral or proportional-integral-derivative algorithm. That is, and as discussed herein, once process 94 is operating with actual variable parameters that are within a range of predetermined, target values, as determined by SOA sub-controller 106, PID sub-controller 108 may employ a proportional, proportional-integral or proportional-integral-derivative algorithm for decreasing the operational range of variable parameter x. The decrease in the operational range of actual variable parameter of process 94 may allow variable parameter x to change operational state more frequently, and may allow process 94 to operate more closely to the target value. That is, and as discussed herein, as a result of sub-controller 108 including an algorithm for determining and modifying variable parameter x, sub-controller 108 may allow process 94 to operate at or near the target value for variable parameter x.

Computing device 103 may access a database 116, which may include a variety of data specific to process 94. For example, the data may include predetermined data, specific to process 94 that may define desired variable parameters of process 94. In one embodiment, the data may include, for example, target values for the variable parameter (see FIGS. 1 and 3), gain or mean adjustments, or parts thereof, used to create a correction signal for the variable parameter, as described herein, and/or other data necessary for controller system 104. The data may be represented or embodied in a variety of conventional data forms including, but not limited to, a look-up table, an algorithm, a model, etc.

Computing device 103 is shown including a processing component 122 (e.g., one or more processors), a storage component 124 (e.g., a storage hierarchy), an input/output (I/O) component 126 (e.g., one or more I/O interfaces and/or devices), and a communications pathway 128. In general, processing component 122 executes program code, such as controller system 104, which is at least partially fixed in storage component 124. While executing program code, processing component 122 can process data, which can result in reading and/or writing transformed data from/to storage component 124 and/or I/O component 126 for further processing. Pathway 128 provides a communications link between each of the components in computing device 103. I/O component 126 can comprise one or more human I/O devices, which enable a human user 112 (e.g., process operator) to interact with computing device 103 and/or one or more communications devices to enable a system user 112 to communicate with computing device 103 using any type of communications link. In some embodiments, user 112 (e.g., process operator) can interact with a human-process interface (HMI) 130, which allows user 112 to communicate with controller system 104 of computing device 103. HMI 130 can include: an interactive touch screen, a graphical user display or any other conventional human-process interface known in the art. To this extent, controller system 104 can manage a set of interfaces (e.g., graphical user interface(s), application program interface, etc.) that enable human and/or system users 112 to interact with controller system 104. Further, controller system 104 can manage (e.g., store, retrieve, create, manipulate, organize, present, etc.) data in storage component 124, such as target values for variable parameter x using any solution. Controller system 104 can also save/retrieve data from database 116.

In any event, computing device 103 can comprise one or more general purpose computing articles of manufacture (e.g., computing devices) capable of executing program code, such as controller system 104, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, controller system 104 can be embodied as any combination of system software and/or application software. Further, controller system 104 can be implemented using a set of modules 132. In this case, a module 132 can enable computing device 103 to perform a set of tasks used by controller system 104, and can be separately developed and/or implemented apart from other portions of controller system 104.

When computing device 103 comprises multiple computing devices, each computing device may have only a portion of controller system 104 fixed thereon (e.g., one or more modules 132). However, it is understood that computing device 103 and controller system 104 are only representative of various possible equivalent computer systems that may perform a process described herein. To this extent, in other embodiments, the functionality provided by computing device 103 and controller system 104 can be at least partially implemented by one or more computing devices that include any combination of general and/or specific purpose hardware with or without program code. In each embodiment, the hardware and program code, if included, can be created using standard engineering and programming techniques, respectively.

When computing device 103 includes multiple computing devices, the computing devices can communicate over any type of communications link. Further, while performing a process described herein, computing device 103 can communicate with one or more other computer systems using any type of communications link. In either case, the communications link can comprise any combination of various types of wired and/or wireless links; comprise any combination of one or more types of networks; and/or utilize any combination of various types of transmission techniques and protocols. Computing device 103 can obtain or provide data using any solution.

While shown and described herein as a system for controlling variable parameter x of a process 94, it is understood that aspects of the invention further provide various alternative embodiments. For example, in one embodiment, the invention provides a computer program fixed in at least one computer-readable storage medium, which when executed, enables a computer system to control variable parameter x of process 94. To this extent, the computer-readable medium includes program code, such as controller system 104 (FIG. 4), which implements some or all of the processes and/or embodiments described herein. It is understood that the term "computer-readable storage medium" comprises one or more of any type of non-transitory or tangible medium of expression, now known or later developed, from which a copy of the program code can be perceived, reproduced, or otherwise communicated by a computing device. For example, the computer-readable storage medium can comprise: one or more portable storage articles of manufacture; one or more memory/storage components of a computing device; paper; etc.

In another embodiment, a system for controlling operation of variable parameter x may be provided. In this case, a computer system, such as computing device 103, can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

Figure 5:
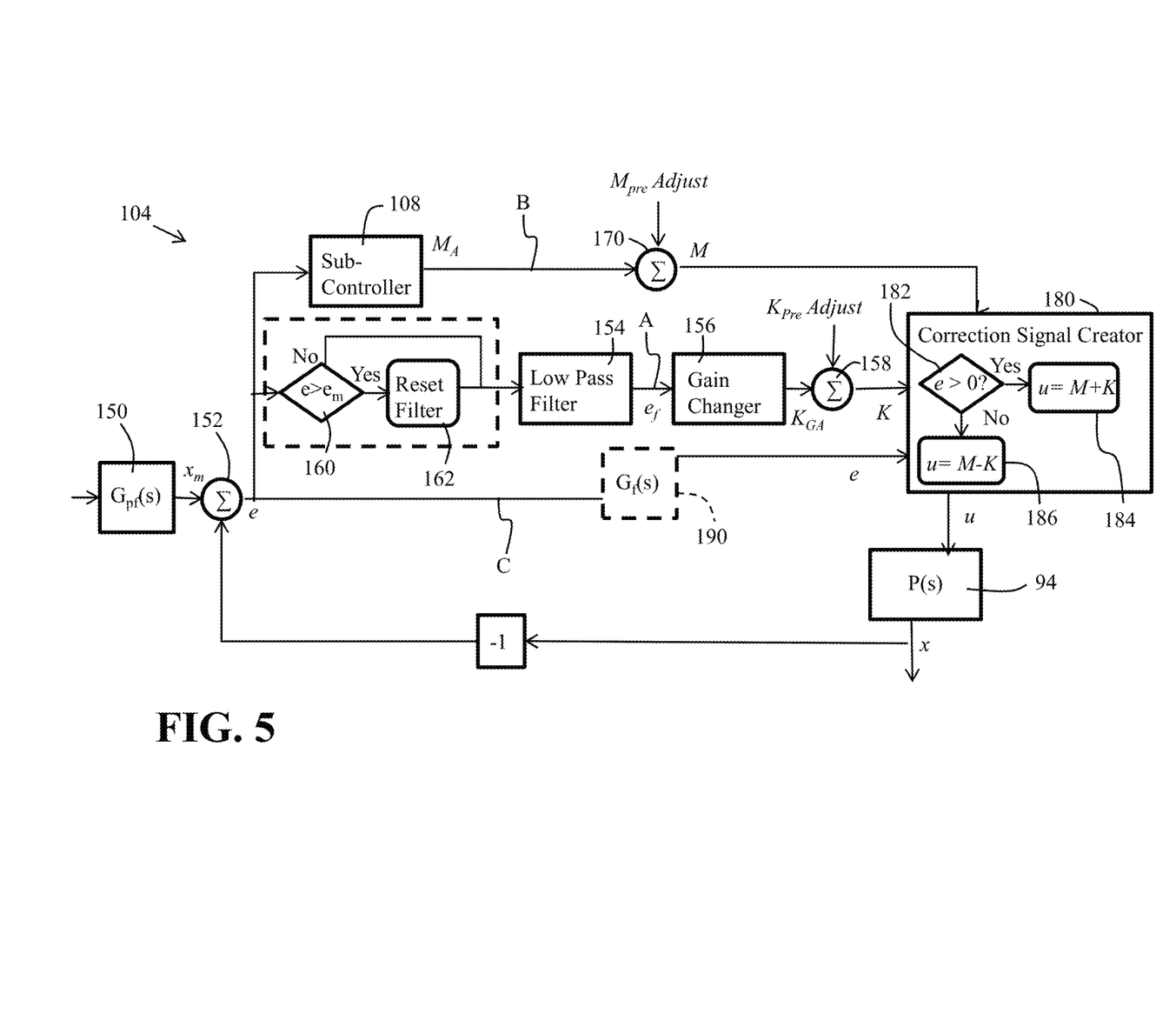
FIG. 5 shows a block diagram of a controller system for a process having a target value for a variable parameter according to embodiments of the invention.

Turning to FIG. 5, a block diagram is shown illustrating an operational flow and functions of controller system 104 (FIG. 4) according to embodiments of the invention. As illustrated in FIG. 5, process 94 (P(s)) provides a variable parameter (herein denoted as 'x' to comport with FIG. 4) as an output thereof. As described herein, variable parameter x may be measured by measuring device(s) 102 (FIG. 4) or calculated by controller system 104 (FIG. 4), as described herein. As indicated above, variable parameter x may be practically any value of any process that lends itself to control by a controller system 104. As will be described, controller system 104 functions to maintain the actual variable parameter x at or near a target value $x_m$ thereof by generating a correction signal u that is used to modify process 94 to change one or more aspects (e.g., traits, components, states, etc.) of the process that impacts variable parameter x.

As shown in FIG. 5, controller system 104 includes a source 150 of a target value $x_m$ of the variable parameter x. Source 150 may include any now known or later developed manner of providing a target value $x_m$ of variable parameter x. For example, source 150 may include a model ($G_{pf}(s)$ as shown in FIG. 5), a look up table, an algorithm, etc. As such, source 150 may be a computational aspect of controller system 104 (e.g., a module 132, FIG. 4) or may be a mechanism to pull a stored value from storage component 124 (FIG. 4) and/or database 116 (FIG. 4).

During operation, controller system 104 computes an error e between target value $x_m$ and an actual value of the variable parameter x. The error e is shown as an output of a summer 152 in FIG. 5, i.e., error e is a difference between target value $x_m$ and the (negative) variable parameter x. It is understood that error e may be computed by a number of other well known or later developed control system algorithms, if desired.

Error e may be used by controller system 104 in a number of ways as illustrated by three paths A, B, C extending left-to-right in FIG. 5. Each block indicates a function, calculation, determination, etc., performed by modules 132 of controller system 104.

In a first path A, in the middle of the block diagram of FIG. 5, controller system 104 calculates a desired gain adjustment K of variable parameter x based on error e. Hence, first path A may be referred to as a "gain changer path". (The functions in the phantom box on first path A are optional and will be described after the other functions in the path). As will become apparent in the description, first path A that calculates desired gain adjustment K of variable parameter x (i.e., low pass filter 154, gain changer 156 and summer 158) and creates correction signal u (i.e., correction signal creator 180) acts as self-oscillating adaptive sub-controller 106 (FIG. 4). Turning to the description of first path A, in one embodiment, error e is first low pass filtered by low pass filter 154. As understood in the art, low pass filter 154 passes frequencies below a certain value and attenuates frequencies above that value. The particular frequency can be user defined or calculated in a known manner relative to operations within process 94. The result of low pass filter is a low passed filtered error $e_f$. Next, gain changer 156 determines a gain adjustment based on low pass filtered error $e_f$. In one embodiment, gain changer 156 may determine the gain adjustment by obtaining a stored value $K_{GA}$ thereof, e.g., from a look up table stored in database 116, based on low passed filtered error $e_f$. Gain adjustment $K_{GA}$ may be derived in any now known or later developed manner, e.g., empirical evaluation, to size the gain for different operating conditions as would be indicated by the filtered error $e_f$. In one embodiment, gain adjustment $K_{GA}$ may be selected to ensure that controller system 104 possesses sufficient authority to reject the largest disturbances at the desired rate while the oscillations under steady-state conditions are still acceptable. Therefore, the value of gain adjustment $K_{GA}$ for a large filtered error value can be selected based on the size of the largest expected error while the value of gain adjustment $K_{GA}$ for a small filtered error can be selected based on the size of oscillations that are acceptable. With the addition of mean adjustment (at 170), it may be possible to select the gain for small errors to be zero since the mean adjustment will ensure that the error is driven to zero eventually.

A summer 158 combines the determined gain adjustment $K_{GA}$ with a predetermined gain adjustment $K_{Pre}$Adjust to calculate desired gain adjustment K, which will be used to create correction signal u. The predetermined gain adjustment $K_{Pre}$Adjust may be based on a desired responsiveness of controller system 104, i.e., transient response requirements, balancing extent of oscillation versus responsiveness. Predetermined gain adjustment $K_{Pre}$Adjust can be selected to be a constant or it can be configured to be scheduled as a function of the filtered or raw reference signal, i.e., target value $x_m$. First (gain changer) path A acts to slowly alter the gain so that controller system 104 can have high gain levels that provide robustness under transient conditions, while lowering the gain under steady-state conditions.

Returning to the phantom box in FIG. 5, in an optional embodiment, controller system 104 may reset the low pass filtering 154 of error e in response to error e exceeding an error threshold $e_m$, which is indicative of a large shift in the error. Under steady state operation, controller system 104 may not react to large changes in target value $x_m$ or large changes in actual variable parameter x from the steady state target value because the steady state typically mandates very small changes to maintain the target value. However, when a large error is observed between target value $x_m$ and actual variable parameter x, low pass filter 154 can be reset to allow a large shift in the correction signal u, described herein. The required size of the error shift, i.e., the size of the error threshold $e_m$, can be user defined and/or process 94 based. In this setting, controller system 104 determines whether error e is larger than an error threshold $e_m$. If the error e is not larger than the error threshold e, i.e., NO at function 160, then low pass filter 154 is not reset. If the error e is larger than the error threshold $e_m$, i.e., YES at function 160, then low pass filter 154 is reset at function 162. In an alternative embodiment, a derivative if target value $x_m$ from source 150 may also be used to determine whether a large error e is occurring or is about to occur.

In a second path B, at the top of the FIG. 5 block diagram, controller system 104 calculates a desired mean adjustment M of variable parameter x based on error e. Hence, second path B may be referred to as a "mean changer path". In one embodiment, desired mean adjustment calculating includes: determining a mean adjustment $M_A$ of error e using PID sub-controller 108 that is, as noted here, one of a proportional, proportional plus integral or a proportional plus integral plus derivative. As known in the art, a proportional controller (P) acts to correct the error based on the present error; a proportional-integral controller (PI) acts to correct the error based on the present error and an accumulation of past errors; and a proportional-integral-derivative (PID) controller acts to correct the error based on the present error, an accumulation of errors and a prediction of future errors, based on current rate of change. As each form of controller is well known in the art, no further details are necessary. In operation, PID sub-controller 108 acts on error e in the fashion of a linear (or near linear) controller with integral action. PID sub-controller 108 may be tuned for optimal transient response with adequate responsiveness using classical loop shaping techniques. A summer 170 combines the determined mean adjustment $M_A$ with a predetermined mean adjustment $M_{pre}$Adjust to calculate desired mean adjustment M. Predetermined mean adjustment $M_{pre}$Adjust may be based on a model of the static characteristics of process 94 determined during a preliminary test of the mean value adjustment feature alone. That is, predetermined mean adjustment $M_{pre}$Adjust may be calculated by employing PID sub-controller 108 alone for an initial period to determine the mean of error e, which is then used as the predetermined mean adjustment $M_{pre}$Adjust. Consequently, desired mean adjustment M includes a minimum adjustment indicative of the predetermined mean adjustment and an additional condition-responsive mean adjustment via PID sub-controller 108. Desired mean adjustment $M_{pre}$Adjust can also be determined and implemented using any known feedforward control method.

As shown in FIG. 5, once a desired mean adjustment M and a desired gain adjustment K have been calculated, a correction signal creator 180 creates a correction signal u for modifying process 94. Correction signal creator 180 may also be referred to in the art as a "relay". Creator 180 uses the desired mean and desired gain adjustments in different ways depending on whether error e is positive, i.e., increasing, or negative, i.e., decreasing. In response to the error being positive, i.e., YES at function 182, creator 180 creates correction signal u by adding the desired mean adjustment and the desired gain adjustment (i.e., at function 184), resulting in a positive correction. That is, correction signal u equals the sum of desired mean adjustment M and desired gain adjustment K, u=M+K. Alternatively, in response to error e being negative, i.e., NO at function 182, creator 180 creates correction signal u by differencing desired mean adjustment M and desired gain adjustment K (i.e., at function 186), resulting in a negative correction. That is, correction signal u equals the difference of desired mean adjustment M and desired gain adjustment K, u=M-K.

As indicated in third, lowermost path C in FIG. 5, in an alternative embodiment, prior to creating correction signal u by creator 180, error e may be lead compensation filtered by a filter 190 ($G_f(s)$), after which lead compensation filtered error is used to determine whether the error is positive or negative. Lead compensation filter 190 can be constructed in any necessary form as established in the literature (e.g., using a linear low-order filter or the use of a process model representing the entitlement capability of the closed loop system). Lead compensation filter 190 may set the frequency of limit cycles (i.e., the oscillations or "chatter" that creator 180 will cause at steady-state). If the lead compensation filtering is not provided, then the raw error e is used from summer 152.

As described above, the first, gain changer path A in FIG. 5 that calculates desired gain adjustment K of variable parameter x (i.e., low pass filter 154, gain changer 156 and summer 158) and creates correction signal u (i.e., correction signal creator 180) acts as self-oscillating adaptive (SOA) sub-controller 106 (FIG. 4). The consequences of SOA sub-controller 106 being combined with PID sub-controller 108 will be described relative to FIG. 6.

Figure 6:
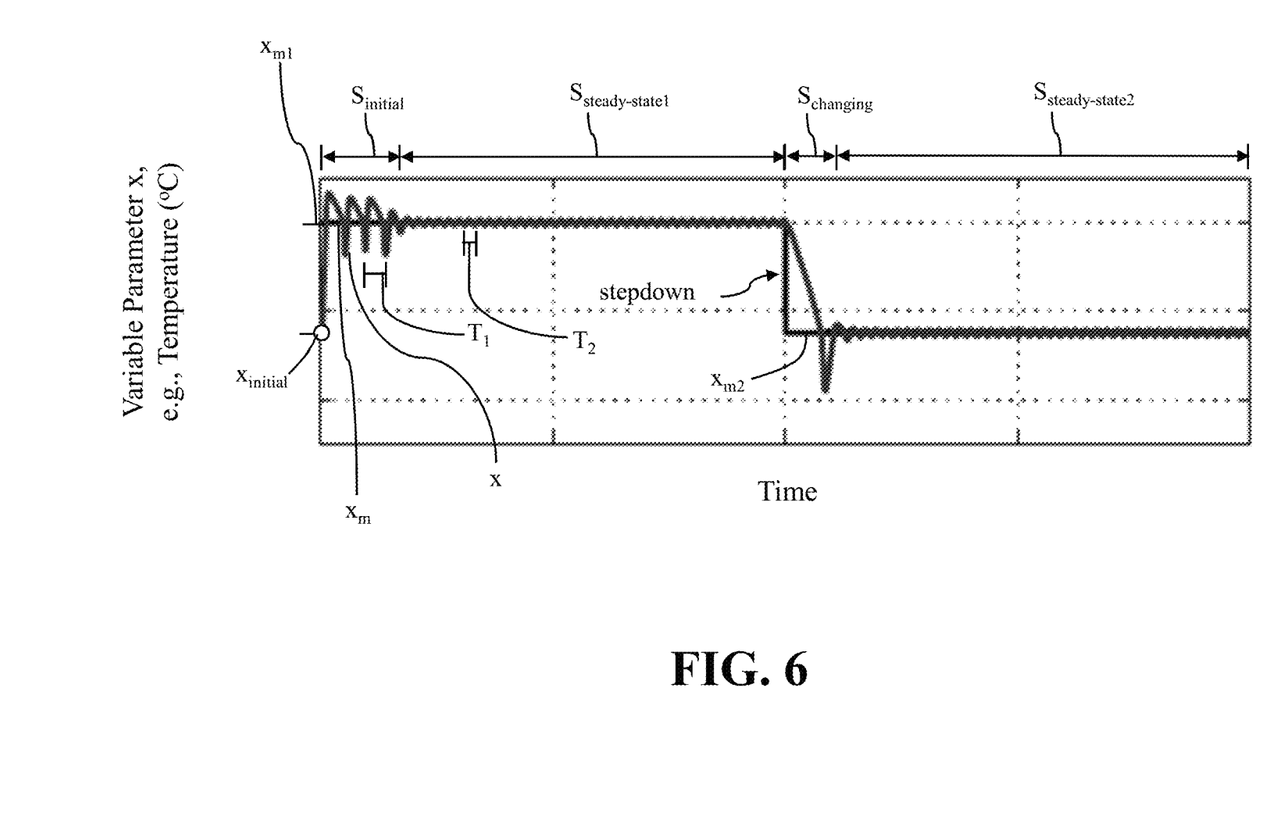
FIG. 6 shows a linear graph illustrating a target value and a variable parameter value of a process as controlled by a controller system according to embodiments of the invention.

With reference to FIGS. 5 and 6, details of an example application will now be described. FIG. 6 shows a linear graph illustrating a target value $x_m$ and an actual value of a variable parameter x of process 94 as controlled by controller system 104 over time according to embodiments of the invention. The example shown relates to a variable parameter in the form of a temperature (° C.) for a working fluid in a steam system; however, the variable parameter is in no way limited to this application. Similar control of any variable parameter is the goal of controller system 104 regardless of the process at issue.

As shown in FIG. 6, source 150 (FIG. 5) may provide a target value $x_m$, i.e., a desired temperature of the working fluid (e.g., steam, gas), over a length of time. In FIG. 6, target value $x_m$ over time has the same pattern as shown in FIGS. 1 and 3 for ease of comparison. That is, as shown in FIG. 6 only, a first target value $x_{m1}$ is employed for a first, desired steady state ($S_{steady-state1}$) have a certain duration, followed by a stepdown to a lower, second target value $x_{m2}$ which is maintained for a second, desired steady state ($S_{steady-state2}$). Variable parameter x is shown as the frequently moving line overlying target value $x_m$. In the illustrative steam turbine process, the process may move from first target value $x_{m1}$ to second target value $x_{m2}$ for a variety of reasons, including, but not limited to: predetermined intervals of stepdown operation for cooling, predetermined intervals of stepdown operation for saving fuel, decrease in the required amount of power generated by process 94, etc. As understood in the art, the process is just as likely to have a step up in value. The teachings of the invention are applicable to either situation.

As shown in FIG. 6, controller system 104 may begin controlling variable parameter x, e.g., work flow temperature in the example, during an initial operational stage ($S_{initial}$). During this stage, process 94 may be modified to change variable parameter x using correction signal u continuously as SOA sub-controller 106 of controller system 104 aids in allowing process 94 to operate with variable parameter x within a predetermined range. As shown in FIG. 6, the actual variable parameter e.g., temperature of a working fluid, may include a value that may be below or less than first target value $x_{m1}$. Controller system 104 of computing device 103 may determine that the actual variable parameter value x of process 94 may differ from a target value $x_{m1}$. As a result, controller system 104, and specifically SOA sub-controller 106, may change process 94, e.g., a portion of the process such as a valve of a heat exchanger, to a different state or position to change the variable parameter, e.g., allow more heat to be added to the working fluid (e.g., steam, gas) as it flows through the heat exchanger and subsequently to process 94 during operation. As shown in FIG. 6, the continuous changing by SOA sub-controller 106 may result in the actual variable parameter x oscillating between a higher and lower than first target value $x_{m1}$. This may ultimately result in process 94 including an oscillating or continuously changing variable parameter x that averages to be substantially equal to first target value $x_{m1}$ of process 94 during the initial operational stage ($S_{initial}$).

This continuous changing of process 94 by SOA sub-controller 106, as shown in an initial operational stage $S_{initial}$ in FIG. 6, may be achieved at a first rate, which may include a large oscillating range for variable parameter x. That is, because SOA sub-controller 106 allows the process (e.g., valve) to quickly adjust variable parameter x, the actual variable parameter x may go above and below first target value $x_{m1}$ at a first rate. As shown in FIG. 6, the first rate may include large oscillations of variable parameter x over a period of time. That is, as shown in FIG. 6, while only SOA sub-controller 106 may control process 94, the actual variable parameter x may oscillate over a large range surrounding the first target value $x_{m1}$, and the actual variable parameter x may include a substantial large first period ($T_1$).

After initially modifying variable parameter x in the initial operational stage an impact of PID controller 108 may begin to be observed. More particularly, as a result of PID sub-controller 108 influencing SOA sub-controller 106, the range of oscillating may be substantially minimal, and the rate of changing the state may be increased compared to the initial operational stage ($S_{initial}$). That is, the second period ($T_2$) of the oscillations of the actual variable parameter x during the first steady-state operational stage ($S_{sieady-state1}$) may be substantially smaller than the first period ($T_1$) of the oscillations during initial operational stage ($S_{initial}$). As such, the operational state of whatever is controlled in process 94 to control variable parameter x may be changed by controller system 104 more quickly. Additionally, in utilizing PID sub-controller 108 in combination with SOA sub-controller 106, and ultimately reducing or minimizing the range of oscillation of the variable parameter, process 94 may operate with the actual variable parameter x substantially equal to first target value $x_{m1}$. The reduction or minimizing of the range of oscillation of variable parameter may ultimately allow process 94 to operate at first target value $x_{m1}$, which may include a desired or optimal operational condition for process 94 and/or may substantially minimize negative effects within process 94 caused by an undesirable variable parameter value during operation of process 94. By comparing FIG. 6 with FIGS. 1 and 3, one can readily observe that the above-described functionality provides superior performance in contrast to use of a PID controller alone (FIG. 1) or an SOA controller alone (FIG. 3), resulting in smaller oscillations with very little change in overall response time of the closed loop system.

As shown in FIG. 6, over the operational time of process 94, the target value may include a rapid change in value. In the example shown, the rapid change is a stepdown; however, as noted above, it could also be a step up. In any event, at the time of the rapid change, the target value $x_{m1}$ quickly changes to a new, second target value $x_{m2}$. In this instance, controller system 104 of computing device 103 continues to operate as before to move variable parameter x to the new target value $x_{m2}$. As before, after a very short settling period of SOA sub-controller 106, the impact of PID sub-controller 108 causes the variable parameter x to track second target value $x_{m2}$ very closely. A similar response is observed for step up changes. As described herein, under steady state operation, controller system 104 may not react to large changes in target value $x_m$ or large changes in actual variable parameter x from the steady state target value because, per PID sub-controller 108 influence, the steady state typically mandates very small changes to maintain the target value. Here, however, a large error is observed between target value $x_m$ and actual variable parameter x such that, as described herein, low pass filter 154 (phantom box FIG. 5) may be reset to allow a large shift in the correction signal u, improving the responsiveness of SOA sub-controller 106. As noted, the required size of the error shift, i.e., the size of the error threshold $e_m$, can be user defined and/or process 94 based.

Controller system 104 including SOA sub-controller 106 and PID sub-controller 108 may be implemented in a wide variety of processes 94 that each include one or more variable parameters. Additionally, controller system 104 may be utilized in a plurality of processes 94, without a significant amount of tuning required by a controller expert. That is, because controller system 104 includes both SOA sub-controller 106 and PID sub-controller 108, which work in combination with one another, controller system 104 may be implemented with a plurality of distinct processes with minimal to no significant amount of tuning. The decrease in the requirement in tuning of controller system 104 may be a direct result of SOA sub-controller 106 and PID sub-controller 108 working in combination, where PID sub-controller 108 substantially influences SOA sub-controller 106, after SOA sub-controller 106 initially controls variable parameter x to allow the process to operate at target values. As a result of controller system 104 being easily (e.g., minimal tuning) implemented with a plurality of distinct processes, time and/or money may be saved for the process including controller system 104 to become operational, as a controls expert may not be required to tune controller system 104. Technical effects of the invention, include, but are not limited to providing a controller system that is capable of providing robust performance under significant variations in the process dynamics without detailed synthesis for each application. The controller system provides process performance improvements and cost reduction through commissioning time savings.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A controller system comprising:
  at least one computing device operably connected to a process having a target value for a variable parameter, the at least one computing device configured to control the variable parameter by performing actions including:
  computing an error between the target value and an actual value of the variable parameter;
  based on the error, calculating a desired gain adjustment of the variable parameter;
  based on the error, calculating a desired mean adjustment of the variable parameter; and
  creating a correction signal for modifying the process by:
  in response to the error being positive, creating the correction signal by adding the desired mean adjustment and the desired gain adjustment, and
  in response to the error being negative, creating the correction signal by differencing the desired mean adjustment and the desired gain adjustment.

2. The controller system of claim 1, wherein the desired gain adjustment calculating includes:
  low pass filtering the error;
  determining a gain adjustment based on the low pass filtered error; and
  combining the determined gain adjustment with a predetermined gain adjustment to calculate the desired gain adjustment.

3. The controller system of claim 2, wherein the gain adjustment determining includes obtaining a stored value thereof, and the predetermined gain adjustment is based on a desired responsiveness of the controller system.

4. The controller system of claim 2, further comprising resetting the low pass filtering of the error in response to the error exceeding an error threshold indicative of a large shift in the error.

5. The controller system of claim 1, wherein the desired mean adjustment calculating includes:
  determining a mean adjustment of the error using a sub-controller that is one of a proportional, proportional plus integral or a proportional plus integral plus derivative; and
  combining the determined mean adjustment with a predetermined mean adjustment to calculate the desired mean adjustment.

6. The controller system of claim 5, wherein the predetermined mean adjustment is based on a model of the static characteristics of the process determined during a preliminary test of the mean value adjustment feature alone.

7. The controller system of claim 1, further comprising:
  lead compensation filtering the error prior to creating the correction signal, the lead filtered error being used to determine whether the error is positive or negative.

8. The controller system of claim 1, wherein the calculating the desired gain adjustment of the variable parameter and the creating the correction signal includes using a self-oscillating adaptive sub-controller.

9. The controller system of claim 1, wherein the calculating the desired mean adjustment of the variable parameter includes using a sub-controller that is one of a proportional, proportional plus integral or a proportional plus integral plus derivative.

10. The controller system of claim 9, wherein the calculating the desired gain adjustment of the variable parameter and the creating the correction signal includes using a self-oscillating adaptive sub-controller.

11. A program product stored on a non-transitory computer readable storage medium for controlling a process having a target value for a variable parameter, the non-transitory computer readable storage medium comprising program code for causing a computer system to:
  compute an error between the target value and an actual value of the variable parameter;
  based on the error, calculate a desired gain adjustment of the variable parameter;
  based on the error, calculate a desired mean adjustment of the variable parameter; and
  create a correction signal for modifying the process by:
  in response to the error being positive, creating the correction signal by adding the desired mean adjustment and the desired gain adjustment, and in response to the error being negative, creating the correction signal by differencing the desired mean adjustment and the desired gain adjustment.

12. The program product of claim 11, wherein the desired gain adjustment calculating code causes the computer to:
   low pass filter the error;
   determine a gain adjustment based on the low pass filtered error; and
   combine the determined gain adjustment with a predetermined gain adjustment to calculate the desired gain adjustment.

13. The program product of claim 12, wherein the gain adjustment determining code obtains a stored value thereof, and the predetermined gain adjustment is based on a desired responsiveness of the controller system.

14. The program product of claim 12, wherein the program cod further causes the computer to reset the low pass filtering of the error in response to the error exceeding an error threshold indicative of a large shift in the error.

15. The program product of claim 11, wherein the desired mean adjustment calculating code:
   determines a mean adjustment of the error using a sub-controller that is one of a proportional, proportional plus integral or a proportional plus integral plus derivative; and
   combines the determined mean adjustment with a predetermined mean adjustment to calculate the desired mean adjustment.

16. The program product of claim 15, wherein the predetermined mean adjustment is based on a model of the static characteristics of the process determined during a preliminary test of the mean value adjustment feature alone.

17. The program product of claim 11, wherein the program code further causes the computer system to:
   lead compensation filter the error prior to creating the correction signal, the lead filtered error being used to determine whether the error is positive or negative.

18. The program product of claim 11, wherein the calculating the desired mean adjustment of the variable parameter code
   uses a sub-controller that is one of a proportional, proportional plus integral or a proportional plus integral plus derivative, and wherein the calculating the desired gain adjustment of the variable parameter code and the creating the correction signal codes use a self-oscillating adaptive sub-controller.

19. A controller system comprising:
   at least one computing device operably connected to a process having a target value for a variable parameter, the at least one computing device configured to control the variable parameter by performing actions including:
   computing an error between the target value and an actual value of the variable parameter;
   based on the error, calculating a desired gain adjustment of the variable parameter by:
      low pass filtering the error,
      determining a gain adjustment based on the low pass filtered error, and
      combining the determined gain adjustment with a predetermined gain adjustment to calculate the desired gain adjustment;
   based on the error, calculating a desired mean adjustment of the variable parameter by:
      determining a mean adjustment of the error using a sub-controller that is one of a proportional, proportional plus integral or a proportional plus integral plus derivative, and
      combining the determined mean adjustment with a predetermined mean adjustment to calculate the desired mean adjustment; and
   creating a correction signal for modifying the process by:
      in response to the error being positive, creating the correction signal by adding the desired mean adjustment and the desired gain adjustment, and
      in response to the error being negative, creating the correction signal by differencing the desired mean adjustment and the desired gain adjustment.

20. The controller system of claim 19, further comprising resetting the low pass filtering of the error in response to the error exceeding an error threshold indicative of a large shift in the error.

* * * * *